(12) United States Patent
Sweeting et al.

(10) Patent No.: US 12,196,339 B2
(45) Date of Patent: Jan. 14, 2025

(54) SNAP-FIT LEVER FOR A VALVE ASSEMBLY

(71) Applicant: WATTS REGULATOR CO., North Andover, MA (US)

(72) Inventors: Philip S. Sweeting, Brooklyn, NY (US); Mahyar Esmaili, Wilmont, NH (US); Paul J. Lake, Waltham, MA (US)

(73) Assignee: WATTS REGULATOR CO., North Andover, MA (US)

( * ) Notice: Subject to any disclaimer, the term of this patent is extended or adjusted under 35 U.S.C. 154(b) by 172 days.

(21) Appl. No.: 17/860,371

(22) Filed: Jul. 8, 2022

(65) Prior Publication Data

US 2024/0011578 A1  Jan. 11, 2024

(51) Int. Cl.
| | |
|---|---|
| *F16K 31/60* | (2006.01) |
| *F16K 11/044* | (2006.01) |
| *F16K 31/524* | (2006.01) |
| *F16K 35/00* | (2006.01) |
| *F16L 27/04* | (2006.01) |
| *F16L 27/08* | (2006.01) |

(52) U.S. Cl.
CPC .......... *F16K 31/605* (2013.01); *F16K 11/044* (2013.01); *F16K 31/52408* (2013.01); *F16K 31/52416* (2013.01); *F16K 35/00* (2013.01); *F16L 27/04* (2013.01); *F16L 27/0849* (2013.01)

(58) Field of Classification Search
CPC ................. F16K 31/605; F16K 11/044; F16K 31/52416; F16K 19/006; F16K 31/56; F16K 31/52408; F16C 11/06; F16C 11/0614; F16C 11/0633; F16C 11/0638; F16C 1/0652; F16C 11/0657; F16C 2226/74; F16C 33/416; F16C 11/0685; F16C 11/069; F16C 11/0623; F16C 11/106; F16C 33/418; F16C 43/08; F16C 43/083; F16C 43/086; F16D 3/221; F16D 2003/22303; F16D 2003/22309; F16D 2003/22306; F16L 27/04; F16L 27/0849
See application file for complete search history.

(56) References Cited

U.S. PATENT DOCUMENTS

| | | | |
|---|---|---|---|
| 3,104,089 A | 9/1963 | Seltsam | |
| 4,166,606 A * | 9/1979 | Kawolics | ................ F16K 41/18 277/346 |

(Continued)

*Primary Examiner* — Atif H Chaudry
(74) *Attorney, Agent, or Firm* — Day Pitney LLP; George Chaclas; Anthony A. Kassas

(57) ABSTRACT

A snap-fit lever for actuation of a valve assembly has an elongated valve stem with a ball. The snap-fit lever has a handle portion and a seat portion coupled to the handle portion. The seat portion defines an entry, a retention cavity, and a passage from the entry to the retention cavity. The passage guides the ball from the entry to the retention cavity. The snap-fit lever has deflectable fingers protruding from the seat portion to form part of the retention cavity and the passage. The deflectable fingers deflect to allow the ball to move from the passage into the retention cavity and capture the ball. The deflectable fingers enable rotation of the handle portion about a first axis of the elongated valve stem and allow rotation of the handle portion about a second axis perpendicular to the first axis for moving the elongated valve stem into an actuated position.

17 Claims, 20 Drawing Sheets

(56) References Cited

U.S. PATENT DOCUMENTS

| | | | |
|---|---|---|---|
| 6,151,729 A * | 11/2000 | Yean | B05B 1/1618 |
| | | | 239/443 |
| D843,168 S | 3/2019 | Donovan et al. | |
| D897,153 S | 9/2020 | Vazin | |
| D945,823 S | 3/2022 | Liaw | |
| 2002/0181999 A1 * | 12/2002 | Raak | F16C 11/0638 |
| | | | 403/122 |

* cited by examiner

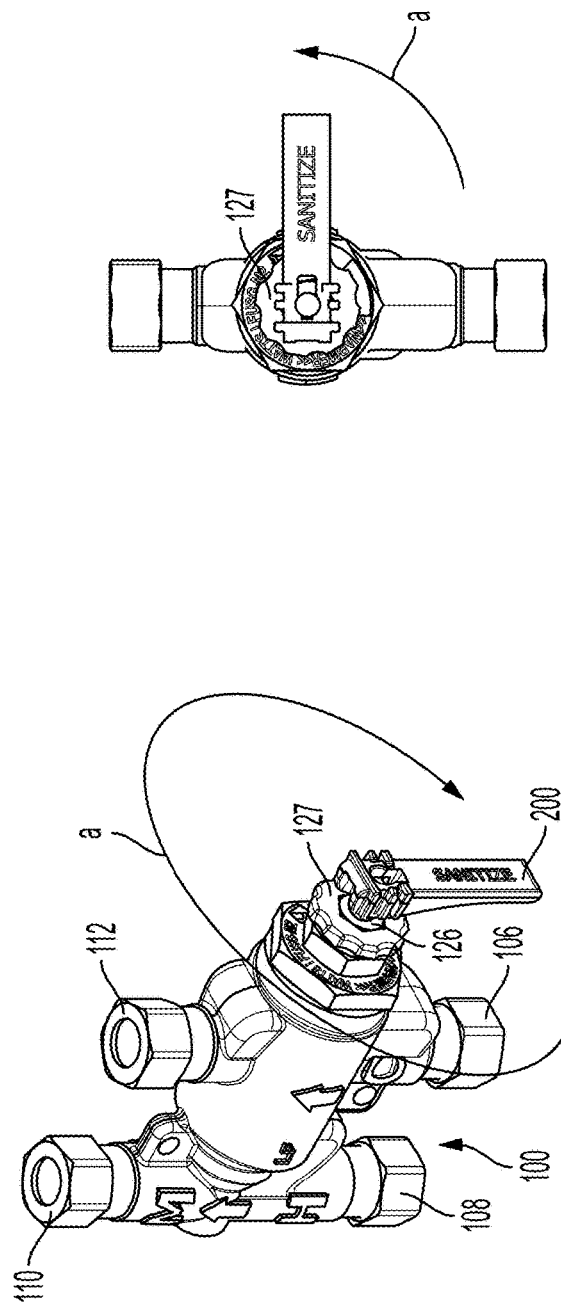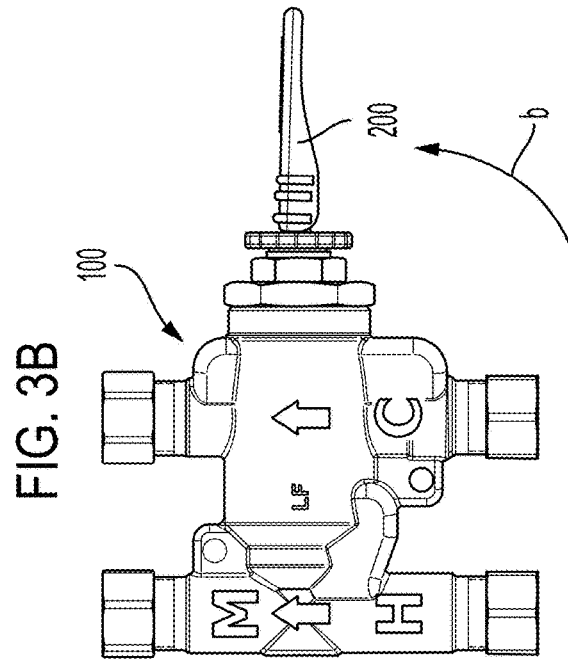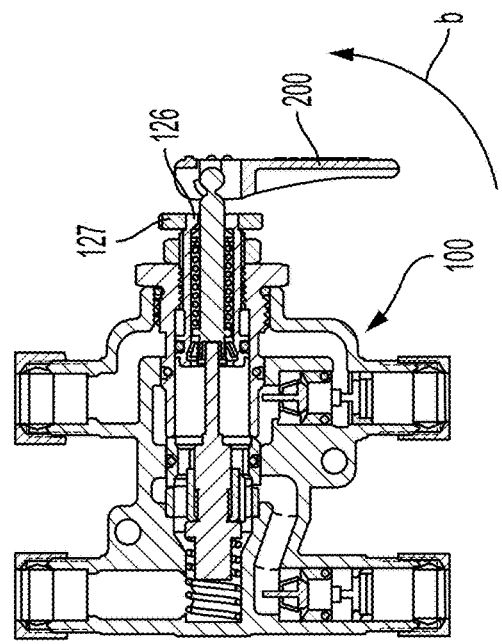

SNAP-FIT LEVER FOR A VALVE ASSEMBLY

BACKGROUND OF THE INVENTION

Field of the Invention

The subject disclosure relates to levers that easily mount to a valve assembly for controlling operation of the valve assembly, and more particularly to a snap-fit lever that is easy to manufacture, install and operate.

Background of the Related Art

Many residential, institutional and commercial faucets are configured to only provide a mixed flow. To prevent scalding, thermostatic mixing valves are used to maintain hot water at a desired temperature (e.g., 105° F.) to avoid the risk of accidental scalding. For example, the Series LFUSG-B Lead Free Under Sink Guardian® Thermostatic Mixing Valves, available from https://www.watts.com/products/plumbing-flow-control-solutions/mixing-valves, uses a thermostat to control hot and cold water temperature with dual check valves that protect against cross flow of hot water to cold and cold water to hot water piping. Also, see U.S. Pat. No. 7,913,926 issued to Goncze on Mar. 29, 2011.

Advantageously, such thermostatic mixing valves can be equipped with a manual override feature to allow flushing the valve with hot water to disinfect the valve. Typically, a lever lets the user selectively engage a thermal flush mode, and a subsequent return to normal operation. In U.S. Pat. No. 3,104,089 to H. O. Seltsam, issued on Sep. 17, 1963, a self-closing faucet is shown that includes a lever 56 that actuates a stem 44. The lever 56 has inward protuberances 76, 78 that are captured in apertures 72, 74 of the stem 44. Similar arrangements simply utilize a pin to couple the lever to the stem. U.S. Design Patent No. D843,168, issued on Mar. 19, 2019 to Donovan et al., and U.S. Design Patent No. D945,823, issued on Mar. 15, 2022, to Liaw, are two additional examples. Many such prior art devices are assembled with pins with are costly and difficult to manufacture.

SUMMARY OF THE INVENTION

In view of the above, a need exists for a lever that quickly and easily mounts while still being easy to manufacture and assemble. The improved lever would also preferably allow for rotational positioning to facilitate operation in tight spaces such as under sinks. There is also a need for a lever that is relatively easier to manufacture by simplifying the number of parts.

Further, many such valve arrangements are subject to inadvertent actuation of the lever. Thus, a lever with a protective cover to prevent inadvertent actuation while allowing for quick and easy access would be beneficial.

The present disclosure is directed to a snap-fit lever for selective actuation of a valve assembly. The valve assembly has an elongated valve stem with a ball. The snap-fit lever includes a handle portion and a seat portion coupled to the handle portion. The seat portion defines an entry, a retention cavity, and a passage from the entry to the retention cavity for guiding the ball from the entry to the retention cavity. A pair of deflectable fingers protrude from the seat portion to form part of the retention cavity and the passage. The deflectable fingers deflect to allow the ball to move from the passage into the retention cavity for capturing the ball in the retention cavity and enabling rotation of the handle portion about a first axis of the elongated valve stem while still allowing rotation of the handle portion about a second axis that is perpendicular to the first axis for selectively moving the elongated valve stem into an actuated position.

Preferably, the entry and retention cavity have rounded walls to match the ball of the valve stem. The seat portion may have a distal rounded surface adjacent a flat portion for camming against the valve assembly and locking in the actuated position, respectively. The seat portion can define a distal open end for allowing passage of the valve stem in the actuated position. To attach the snap fit lever to the valve stem, a user pushes the ball into the entry and pulls on the handle portion in a proximal direction to move the ball into the retention.

Another embodiment of the present disclosure includes a snap-fit lever for selective actuation of a valve assembly including a proximal handle portion and a seat portion coupled to the handle portion. The seat portion defines an entry connected to a retention cavity. A finger protrudes from the seat portion to form part of the retention cavity and deflects to allow the ball to move from the entry into the retention cavity for capturing the ball in the retention cavity. A user pushes a ball of the valve stem into the entry and pulls on the handle portion in a proximal direction to move the ball into the retention cavity and, thereby, attach the snap fit lever to the valve stem. Preferably, the seat portion has a distal rounded surface adjacent a flat portion for camming against the valve assembly and locking in the actuated position, respectively. The seat portion can define a distal open end for allowing passage of the valve stem in the actuated position. The entry and retention cavity may have rounded walls to match the ball of the valve stem.

Still another embodiment of the present disclosure includes a snap fit lever for actuation of a valve stem of a valve assembly. The valve stem has a ball connector disposed thereon. The snap fit lever includes a lever housing having a handle portion and a seat portion that defines an entry. A retention cavity is defined by an interior of the lever housing. A passage extends into the lever housing, initiating at the entry and terminating in the retention cavity, the passage defines a guide slot to facilitate insertion of the ball connector through the passage. A deflectable finger forms part of the retention cavity and can deflect upon insertion of the ball connector through the passage and into the retention cavity. The finger also undeflects and sweeps around to cup the ball connector once the ball connector reaches the retention cavity, enabling a snap fit between the ball connector and the snap fit lever.

Preferably, the guide slot comprises two grooves defined by opposite passage walls, the guide slot extending from the entry to the retention cavity. In one embodiment, the deflectable finger deflects out of the passage by a radial hinging motion to enable the ball connector to reach the retention cavity. In this regard, the deflectable finger comprises an unsecured proximal arm and a distal arm fixed to the retention cavity to enable the deflectable finger to hinge from the distal arm upon deflection. The lever housing is configured to rotate 360 degrees around the ball connector once the ball connector reaches the retention cavity.

Yet another embodiment of the present invention includes a mixing valve including a housing defining first and second inlets for receiving a first and second flow. A mixing chamber is in fluid communication with the first and second inlets and an outlet is in fluid communication with the mixing chamber. A plunger is received within the mixing chamber for providing fluid communication between the first and second inlets. A first and second seat control the first and second flow. A spring assembly has a valve stem and a ball connector. The spring assembly biases the plunger away between the first and second seats. A snap fit lever for actuation of the valve stem includes a lever housing defining a handle portion with an entry defined by a surface of the lever housing. A retention cavity is also defined by an interior of the lever housing. A passage extends into the lever housing, initiating at the entry and terminating in the retention cavity. At least one deflectable finger forms part of the retention cavity. The deflectable finger is configured to deflect upon insertion of the ball connector through the passage and into the retention cavity and undeflect and sweep around to cup the ball connector once the ball connector reaches the retention cavity, enabling a snap fit between the ball connector and the snap fit lever.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed technology appertains will more readily understand how to make and use the same, reference may be had to the following drawings.

FIG. 3A is a first perspective view of a thermostatic mixing valve having a purge lever in a normal position in accordance with the subject technology.

FIG. 3B is a plan view showing the purge lever of the thermostatic mixing valve of FIG. 3A in the normal position.

FIG. 3C is a cross-section view of the thermostatic mixing valve of FIG. 3B with the purge lever in the normal position.

FIG. 3D is a plan view of the thermostatic mixing valve of FIG. 3B with the purge lever in the actuated or purge position.

DETAILED DESCRIPTION OF PREFERRED EMBODIMENTS

Figure 1A:
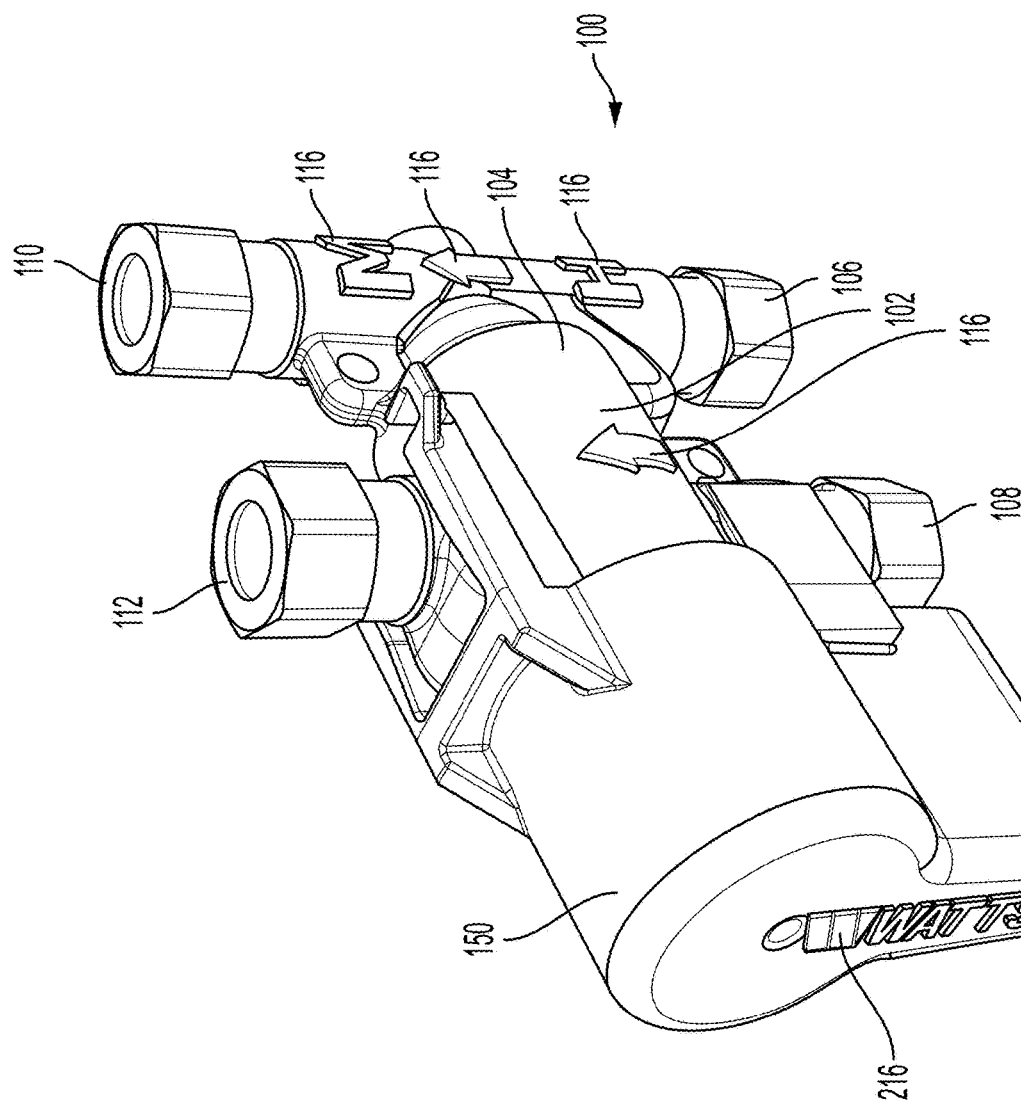
FIG. 1A is a first perspective view of a thermostatic mixing valve having a purge lever enclosed by a protective cover in accordance with the subject technology.
Figure 1B:
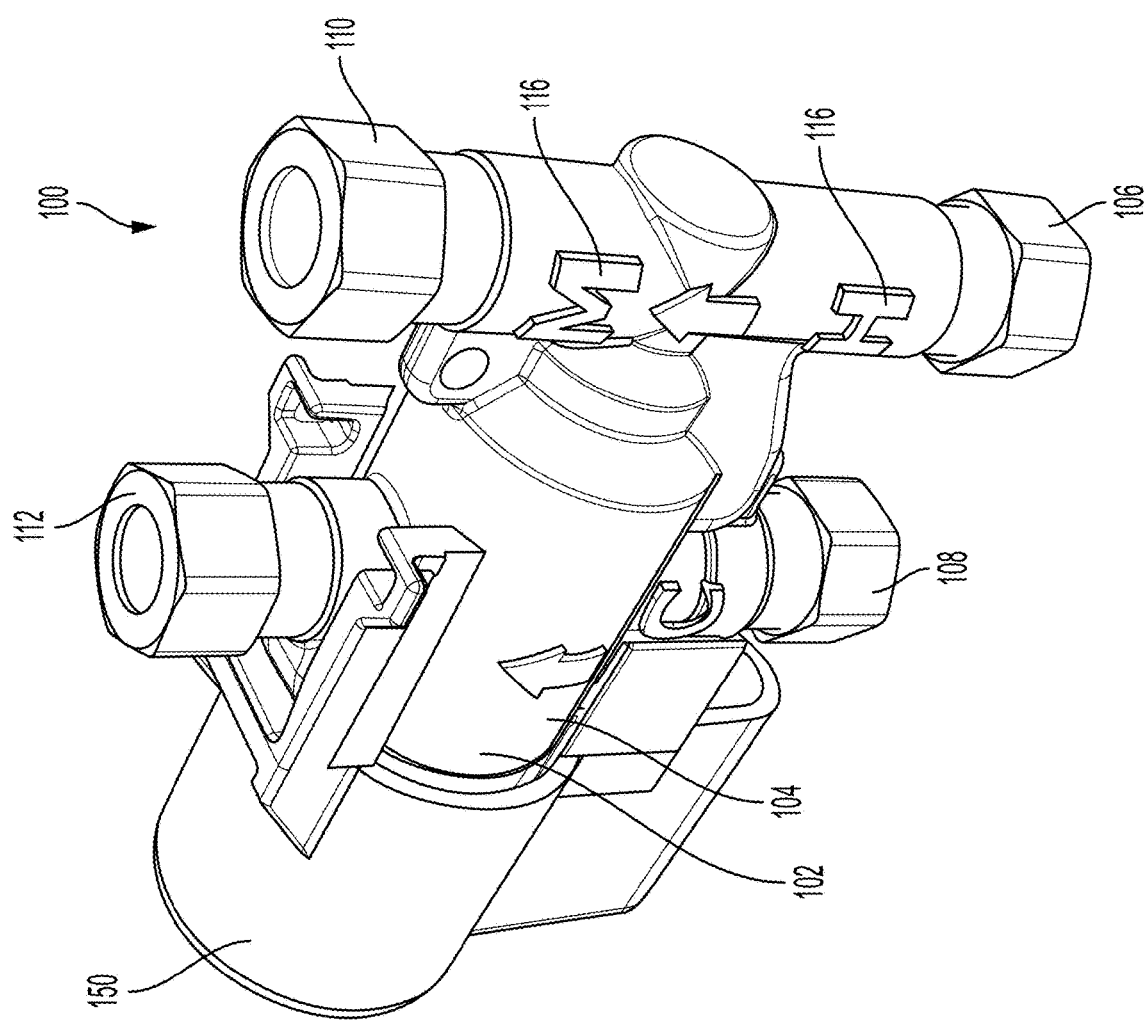
FIG. 1B is a second perspective view of a thermostatic mixing valve having a purge lever enclosed by a protective cover in accordance with the subject technology.

The subject technology overcomes many of the prior art problems associated with fabricating and using lever assemblies. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

In brief overview, the subject technology is directed to a snap-fit lever for selective actuation of a valve assembly. The valve assembly has an elongated valve stem with a ball that couples to the lever. The snap-fit lever has a seat portion with a handle portion extending therefrom. The seat portion defines an entry, a retention cavity, and a passage extending from the entry to the retention cavity for guiding the ball from the entry into the retention cavity. A pair of opposing deflectable fingers form part of the retention cavity and the passage. The deflectable fingers are configured to allow the ball to move from the passage into the retention cavity for capturing the ball in the retention cavity and enabling rotation of the handle portion about a first axis of the elongated valve stem while still allowing rotation of the handle portion about a second axis that is perpendicular to the first axis for selectively moving the elongated valve stem in a thermal flush position. A protective cover prevents inadvertent actuation of the valve. Although the following description is with respect to a point-of-use application, point-of-source applications such as with a hot water heater and other applications are clearly able to utilize the subject technology as would be appreciated by one of ordinary skill in the art.

Referring now to FIGS. 1A, 1B, and 2A-C, there are shown various views of a thermostatic mixing valve assembly 100 having a purge lever 200 enclosed by a protective cover 150 in accordance with the subject technology. The mixing valve assembly 100 has a main body 102 typically fabricated from brass. The main body 102 has a central tubular portion 104 with depending hot and cold inlets 106, 108, an upstanding mixed outlet 110, and an upstanding cold outlet 112. The protective cover 150 couples to the main body 102 and is described in more detail below with respect to FIGS. 15-17. The main body 102 and protective cover 150 may include indicia 116 such as trademarks, flow arrows, temperature indicators and the like.

Figure 2A:
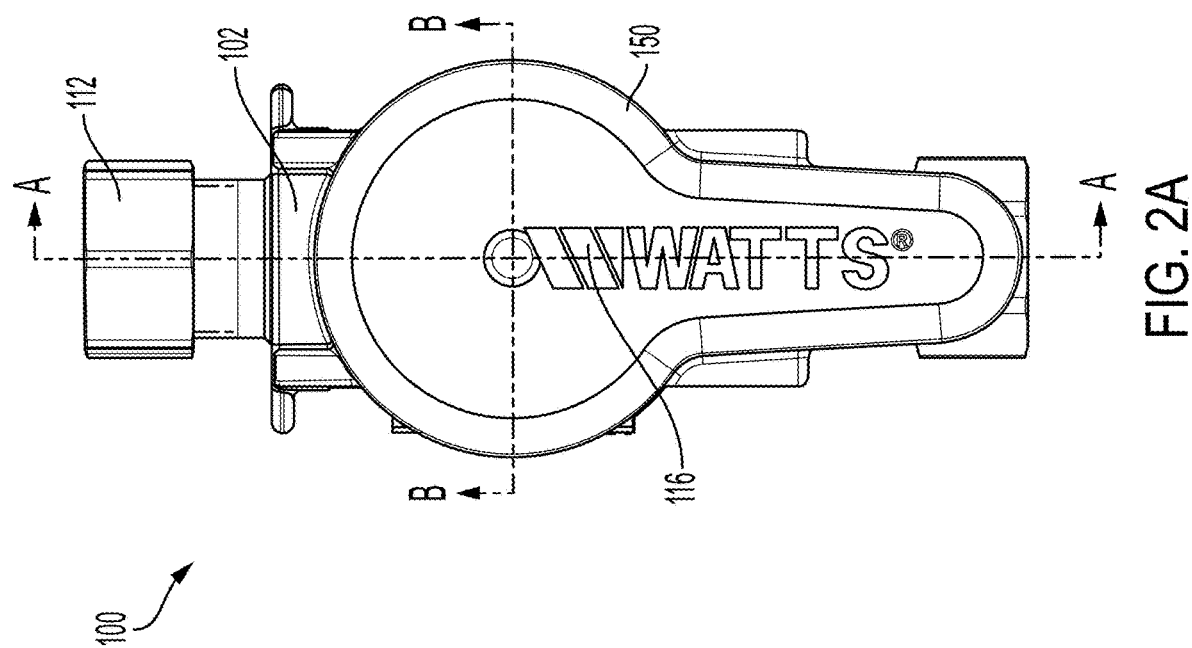
FIG. 2A is a plan view showing a top of the protective cover mounted on the thermostatic mixing valve of FIG. 1.
Figure 2B:
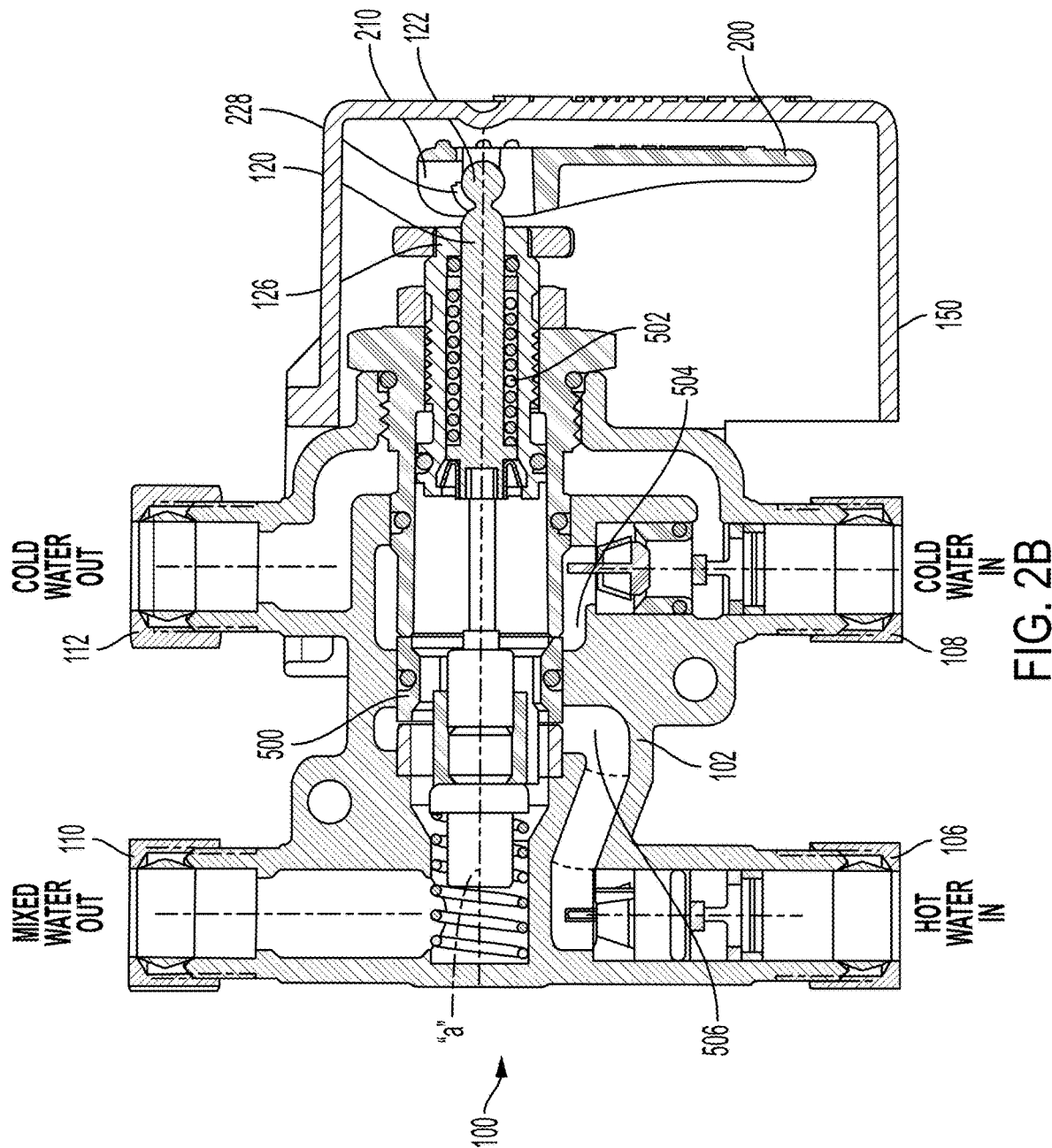
FIG. 2B is a cross-section view of the thermostatic mixing valve of FIG. 2A taken along cut line A-A.
Figure 2C:
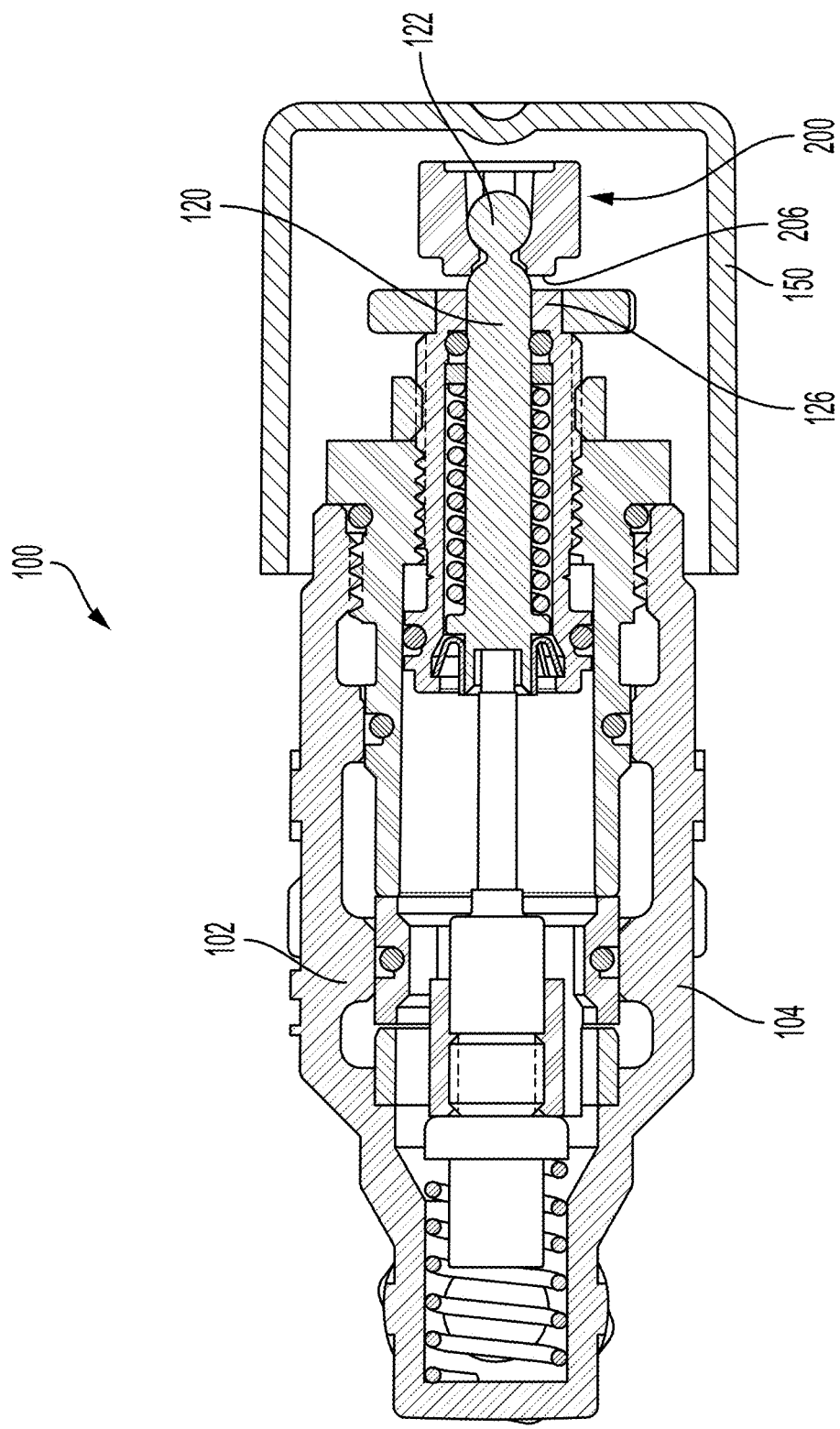
FIG. 2C is a cross-section view of the thermostatic mixing valve of FIG. 2A taken along cut line B-B.
Figure 4:
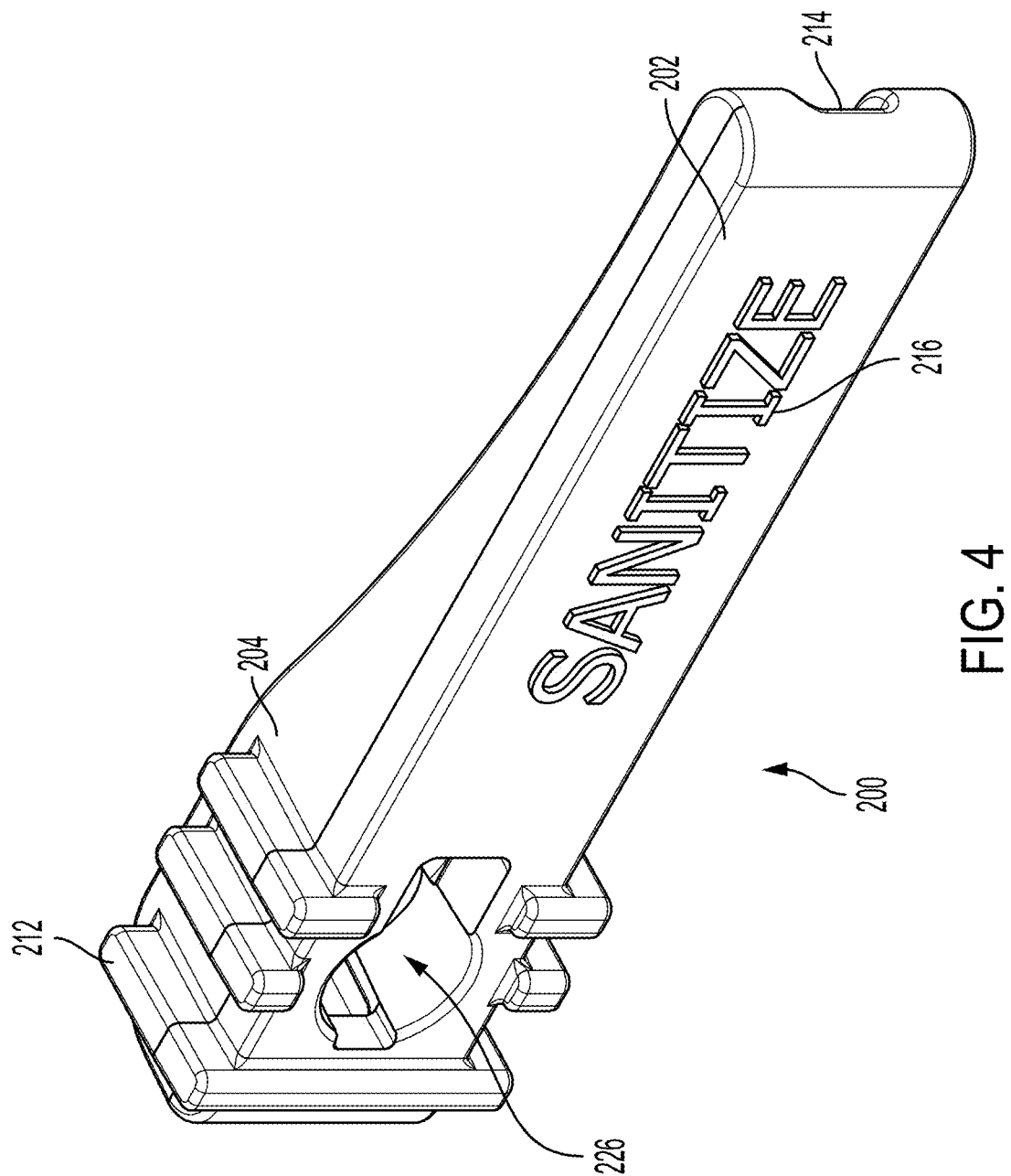
FIG. 4 is a top perspective view of a snap-fit lever in isolation in accordance with the subject technology.
Figure 5:
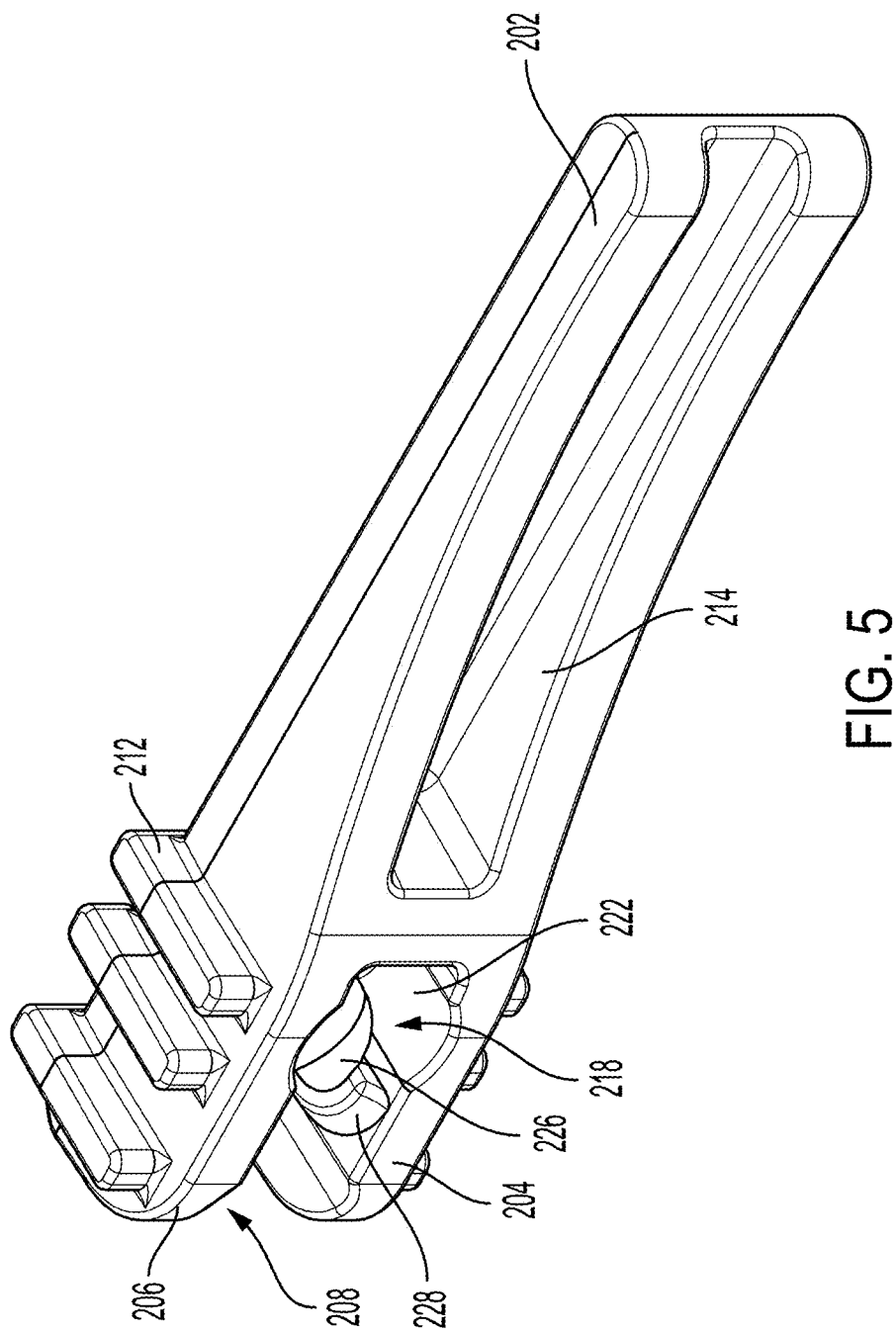
FIG. 5 is a bottom perspective view of the snap-fit lever of FIG. 4.
Figure 6:
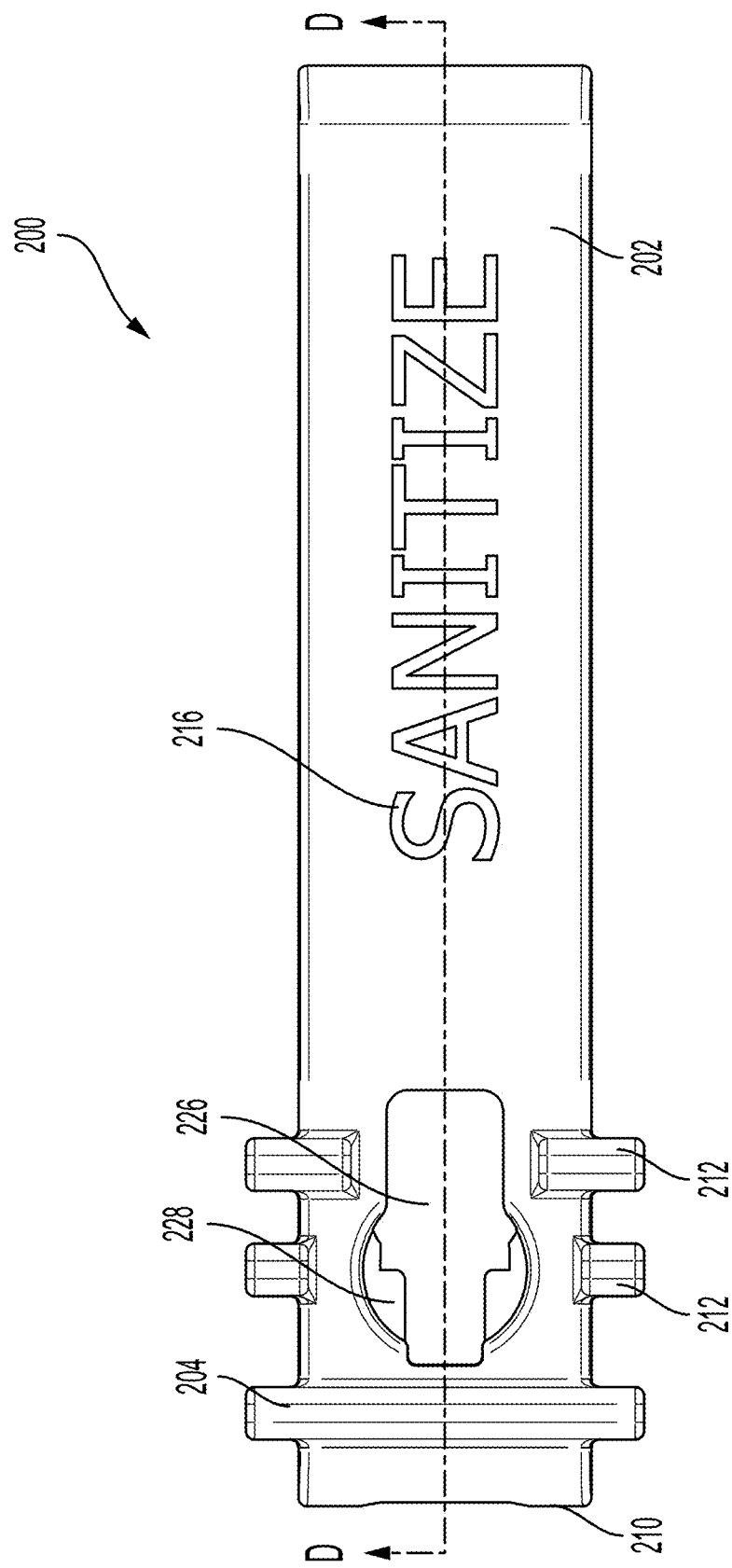
FIG. 6 is a top view of the snap-fit lever of FIG. 4.
Figure 7:
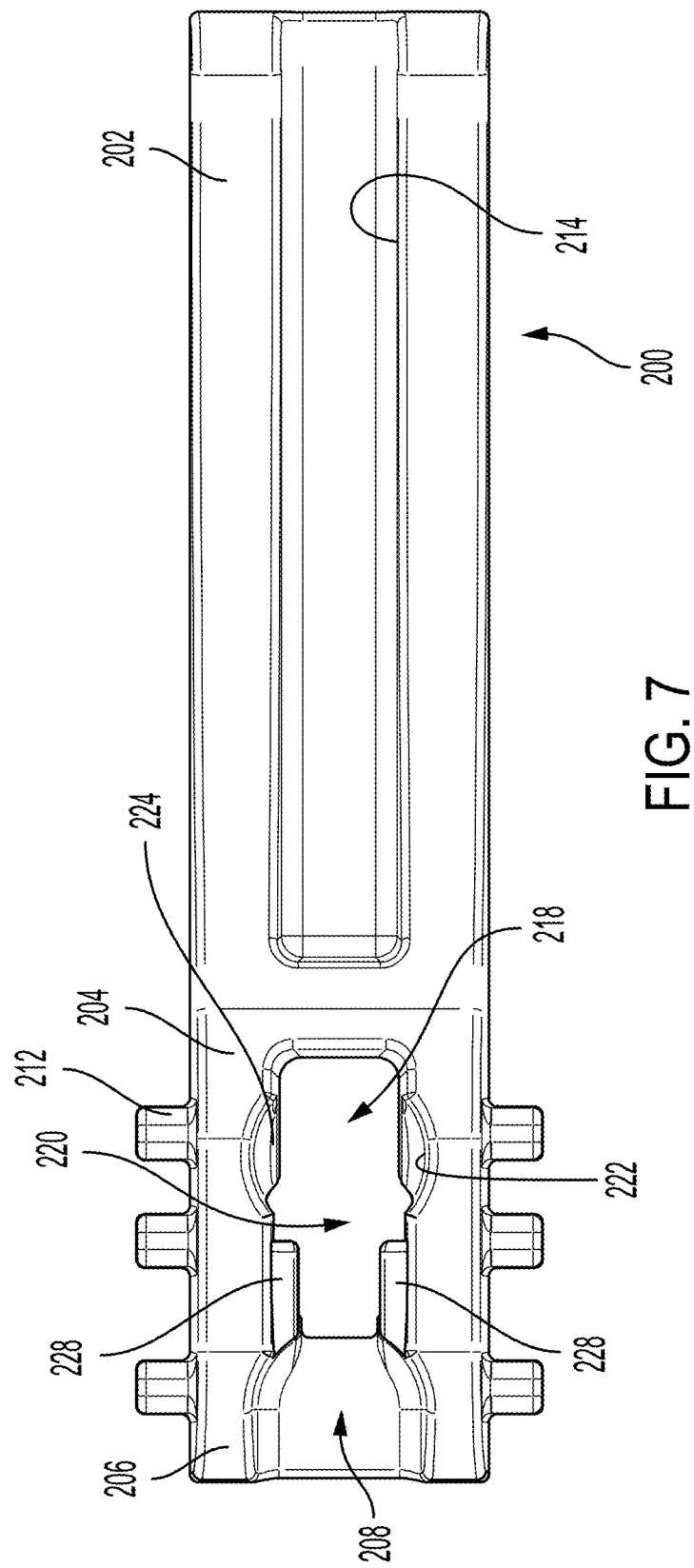
FIG. 7 is a bottom view of the snap-fit lever of FIG. 4.
Figure 8:
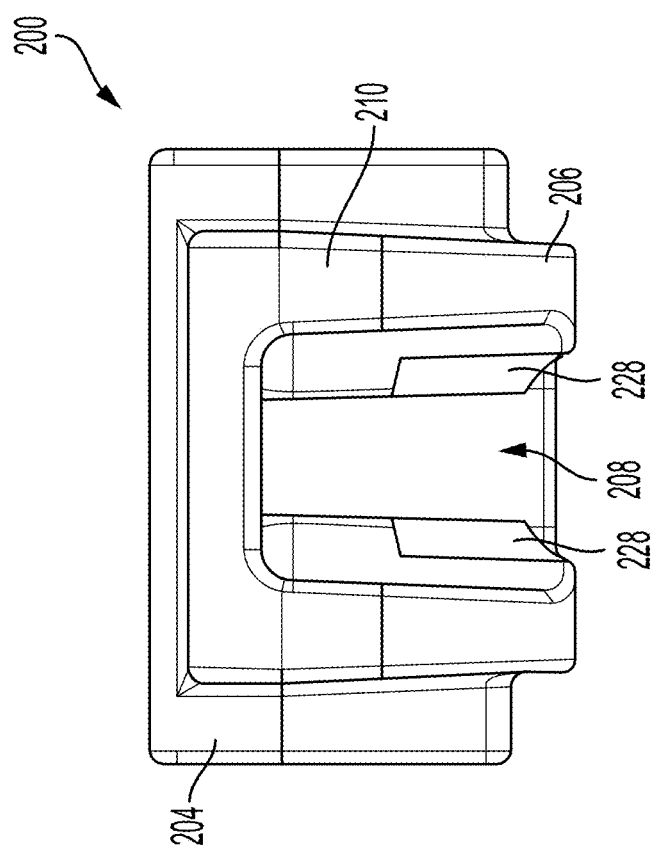
FIG. 8 is a distal end view of the snap-fit lever of FIG. 4.
Figure 9:
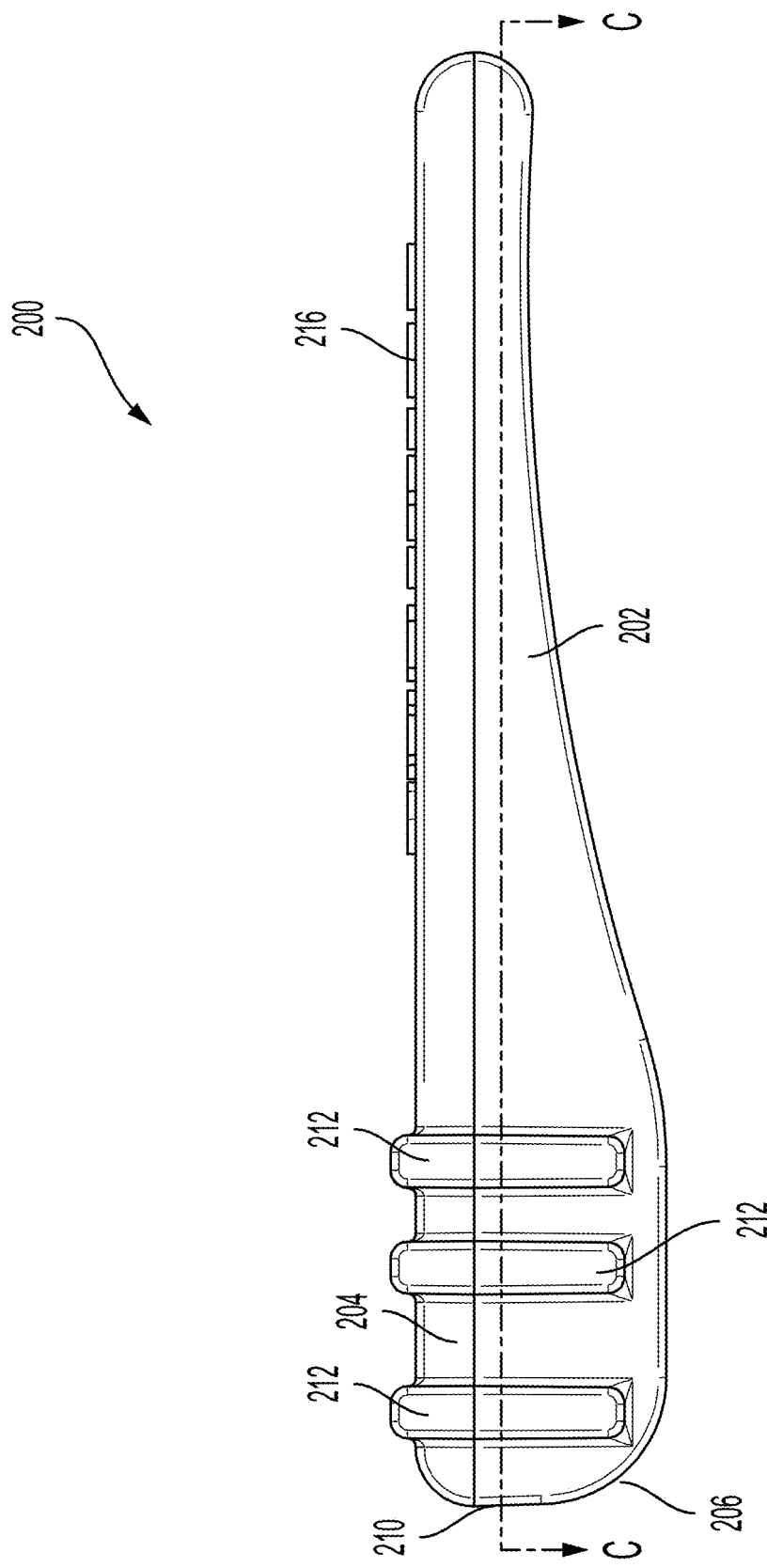
FIG. 9 is a side view of the snap-fit lever of FIG. 4.
Figure 10:
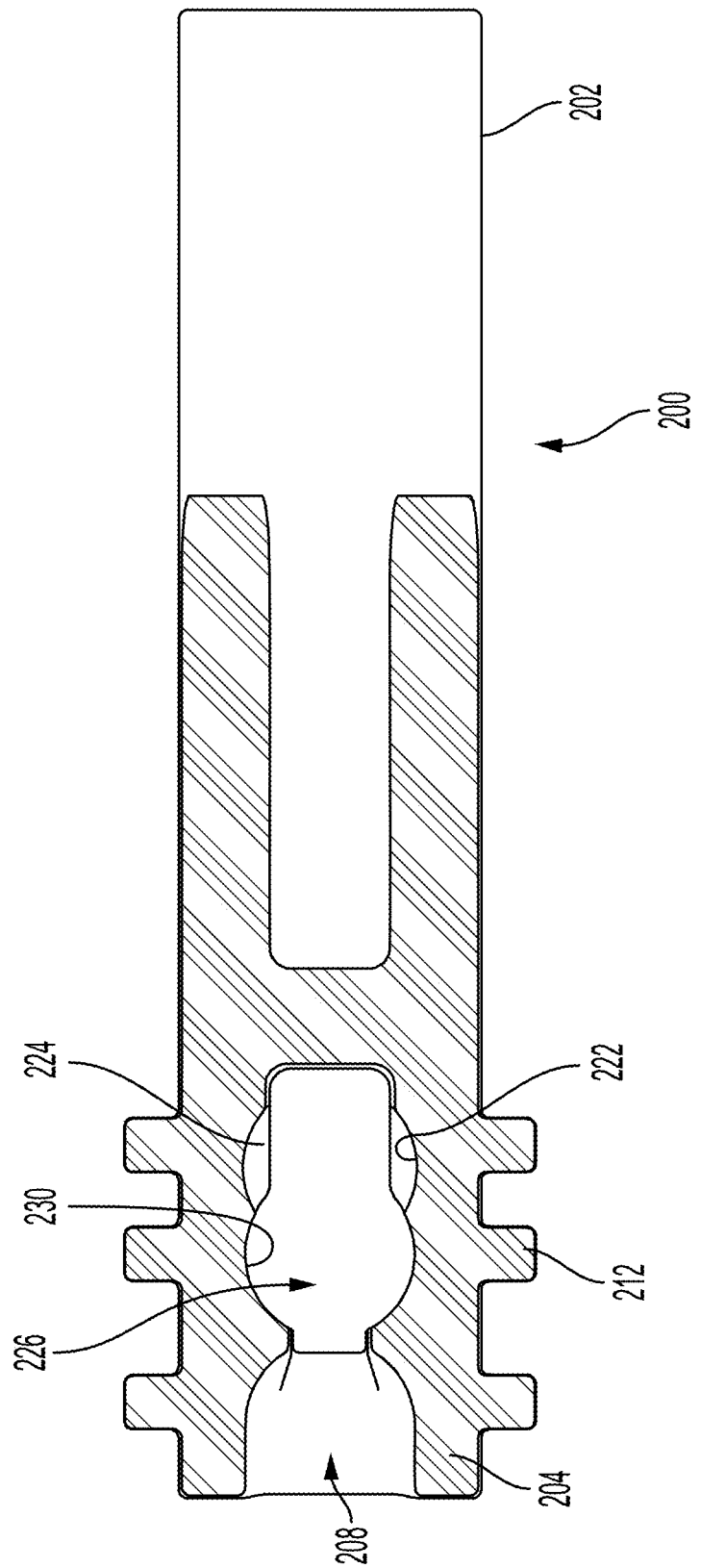
FIG. 10 is a cross-section view of the snap-fit lever taken along cut line C-C of FIG. 9.

Referring more particularly to FIGS. 2B and 2C, cross-sectional views of the thermostatic mixing valve assembly 100 are shown in a normal position. Many of the operational aspects and structural details of the thermostatic mixing valve assembly 100 are known so the following description discusses mainly interaction between the thermostatic mixing valve assembly 100 and a lever 200. The lever 200 is utilized to selectively purge the thermostatic mixing valve assembly 100 with hot water by pulling a valve stem 120 outward. The valve stem 120 is connected to a valve member 500. When the valve steam 120 and the valve member 500 are pulled against the force of an overtravel spring 502 into a purge position (see FIG. 3D). In the purge position, the valve member 500 closes a cold water passageway 504 and opens a hot water passageway 506 so that the interior portions of the mixing valve assembly 100 are filled with hot water for thermal flushing and disinfection. The valve stem 120 terminates in a ball 122 that couples to the lever 200. The valve stem 120 is surrounded by a flange 126. Preferably, the flange 126 is extended by a ring 127.

Referring now to FIGS. 3A and 3B, the lever 200 is free to rotate in a circle as shown by arrows "a" while remaining in the normal position. Such rotation allows being able to move the lever 200 to a preferred orientation for actuation when the mixing valve assembly 100 is mounted in a confined location. Referring now to FIGS. 3C and 3D, the lever 200 is moved from the normal position to the purge position by movement as shown by arrows "b". By lifting, or actuating the lever 200, the valve stem 120 is pulled into the purge position the force of the overtravel spring 502. As described in more detail below, the mixing valve assembly 100 and lever 200 are configured to remain in the normal and purge positions without requiring the user to hold the lever 200.

Referring now to FIGS. 4-13, various views of the lever 200 are shown. The elongated lever 200 has a proximal handle portion 202 that allows a user to easily grasp and apply force to a distal seat portion 204 coupled to the handle portion 202. The seat portion 204 forms a rounded cam surface 206 with an open end 208. When the valve stem ball 122 is captured in the seat portion 204, the lever 200 smoothly rotates between the normal position and the purge position. To use the lever 200 to pull the valve stem 120 outward from the valve body 102, the lever 200 is rotated away from the valve body 102 (e.g., along arrows "b" in FIGS. 3C and 3D) so that the rounded cam surface 206 rides on the flange 126.

Preferably, the open end 208 has a flat portion 210 that sits on the flange 126 to allow the lever 200 to remain in the purge position without external force from the user. In the purge position, the thermostatic mixing valve assembly 100 opens to a maximum hot water flow, e.g., the purge position. As the lever 200 is preferably made of plastic, stiffening ribs 212 and walls 214 provide increased strength. The lever 200 may also include helpful indicia 216 such as operational information (e.g., SANITIZE), trademarks and the like.

As best seen in FIGS. 5, 7, 10, 11 and 13, the seat portion 204 defines an entry 218 for receiving the valve stem ball 122. In one embodiment, the entry 218 has a keyhole shape. A passage 220 extends from the entry 218 and is formed by two opposing rounded walls 222 that extend transversely and partially into the seat portion 204. The rounded walls 222 effectively guide the valve stem ball 122 to a partially closed end 224 when the valve stem ball 122 is pushed into the entry 218. The passage 220 opens into a retention cavity 226 that also has opposing rounded walls 230 and may extend completely through the seat portion 204 as shown.

Figure 11:
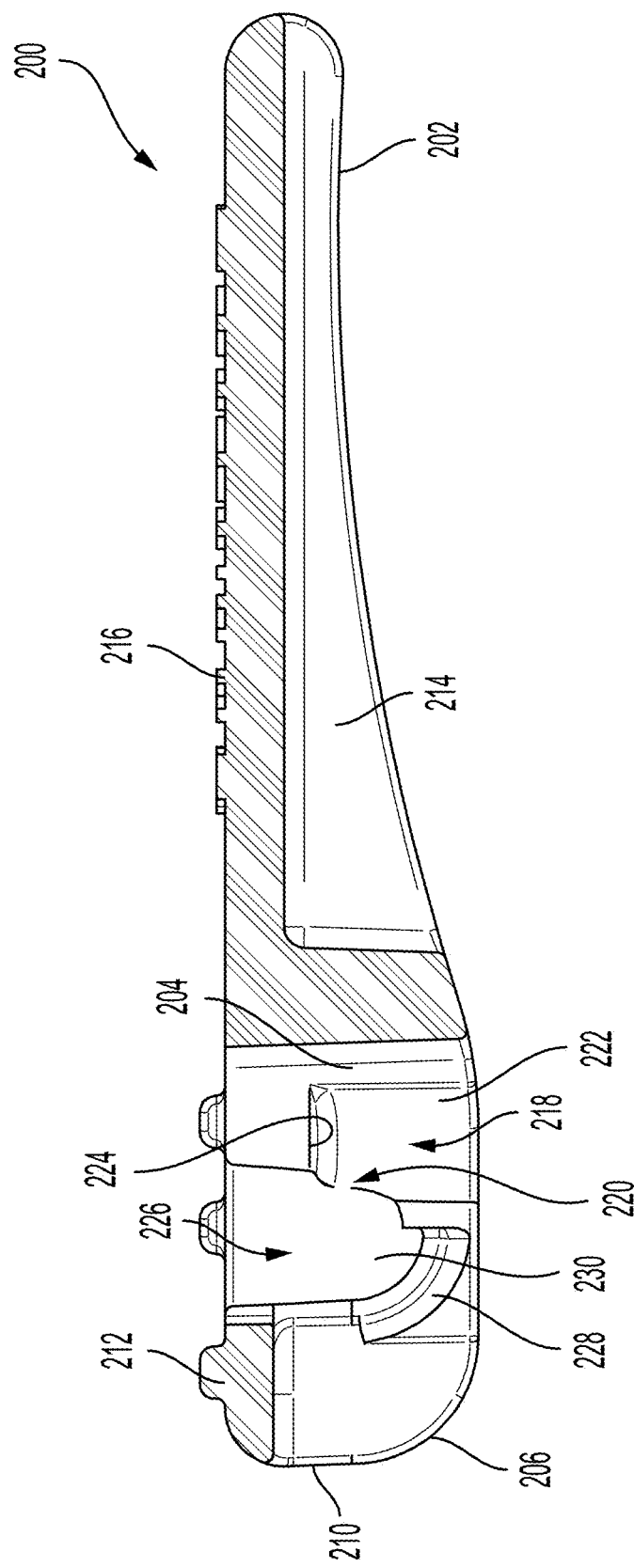
FIG. 11 is a cross-section view of the snap-fit lever taken along cut line D-D of FIG. 6.
Figure 12:
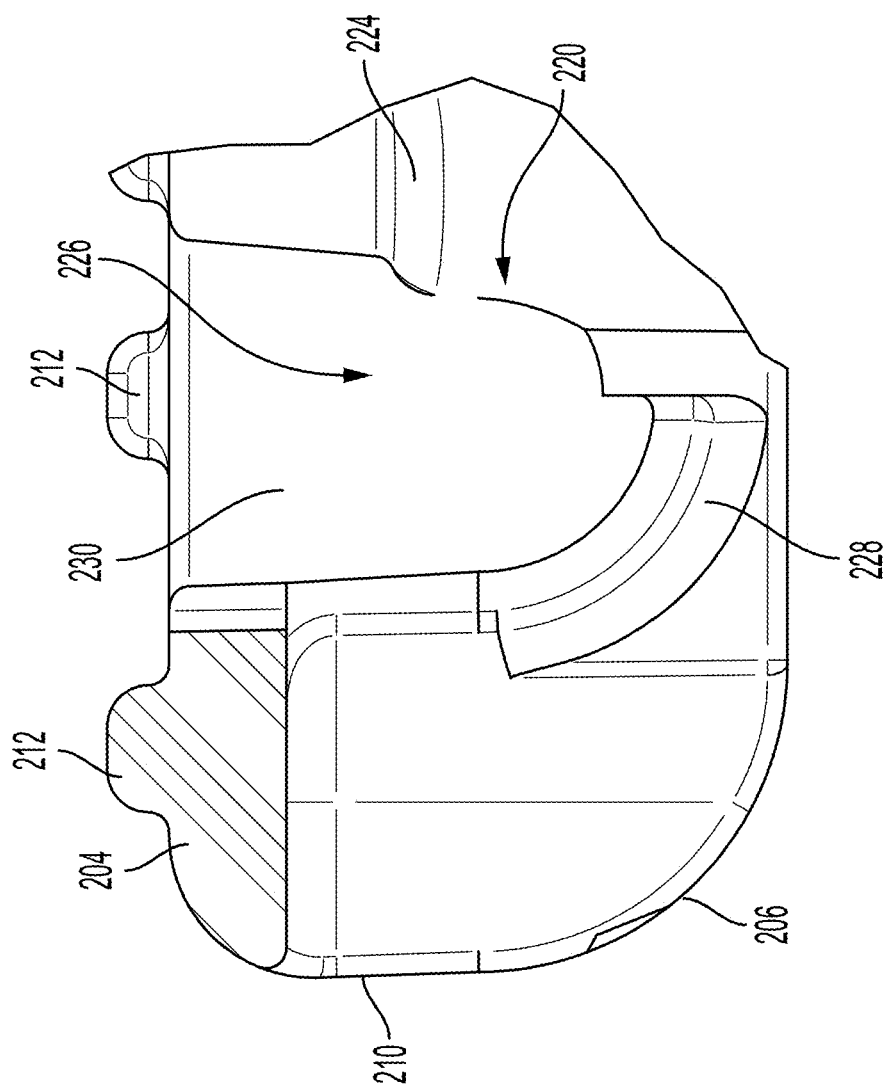
FIG. 12 is an isolated plan view of a retention cavity internal to the snap-fit lever of FIG. 4.
Figure 13:
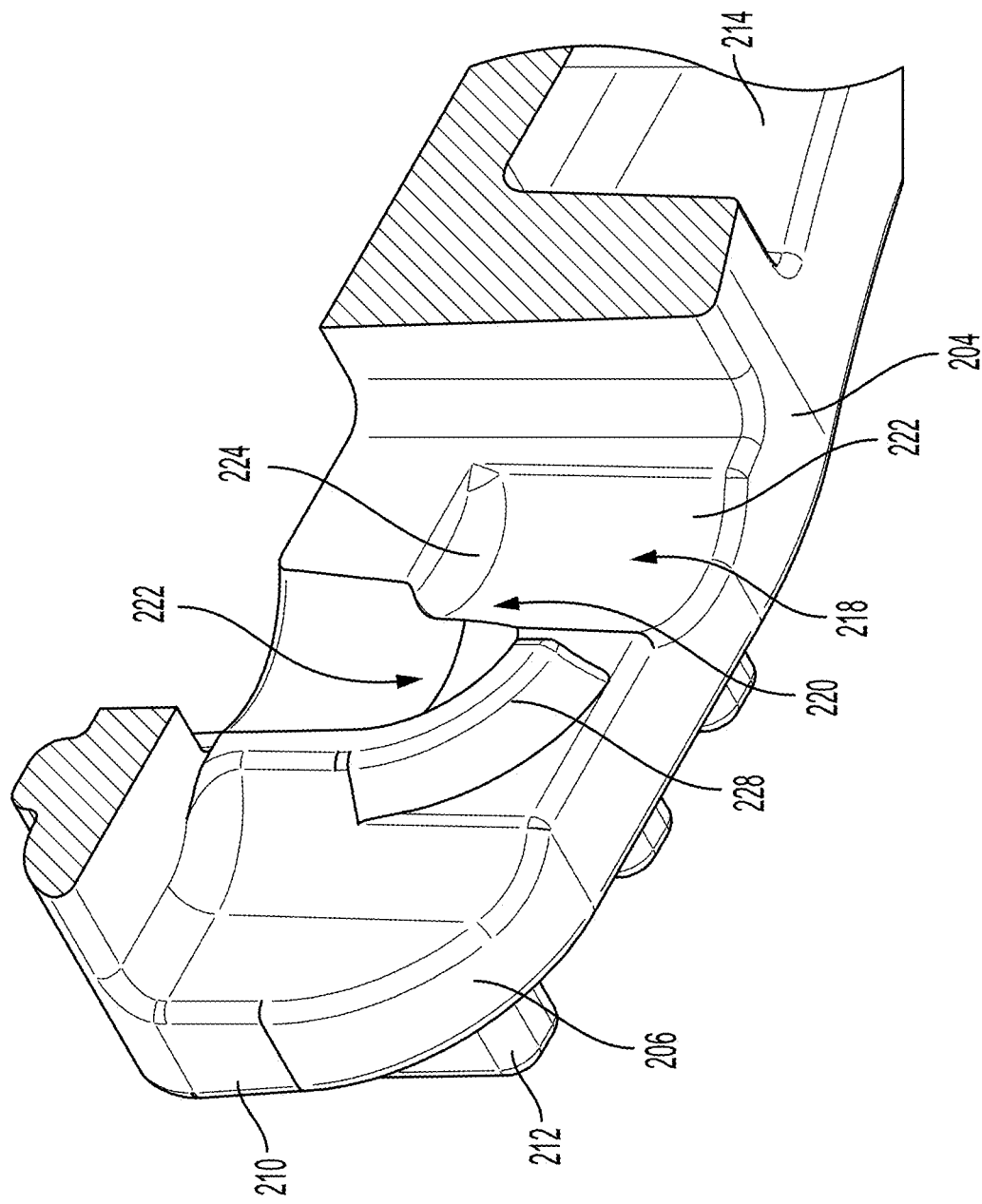
FIG. 13 is an isolated perspective view of the retention cavity of FIG. 12.

As best seen in FIGS. 11-13, a pair of deflectable fingers 228 protrude from the seat portion 202 to form part of the retention cavity 226 and the passage 220. Preferably, the fingers 228 are arcuate shaped. The deflectable fingers 228 allow the valve stem ball 122 to move from the passage 220 into the retention cavity 226.

Figure 14D:
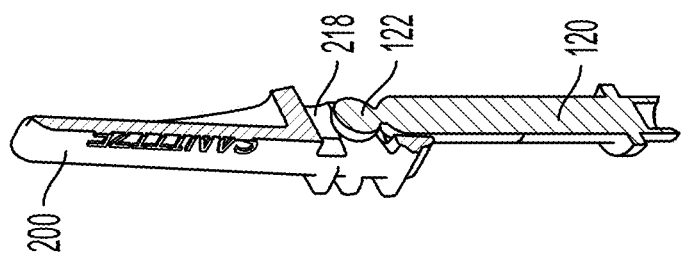
FIGS. 14A-D are sequential cross-sectional views of the lever being mounted on the valve stem in accordance with the subject disclosure.
Figure 14C:
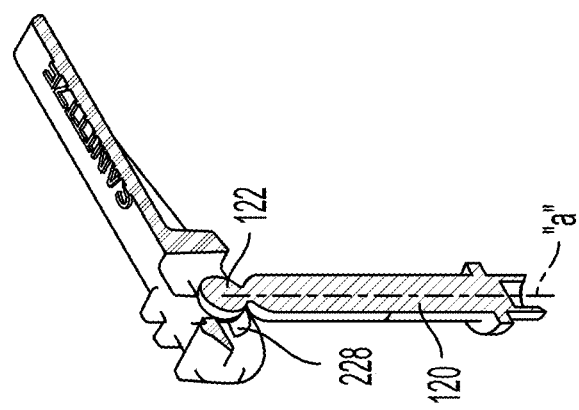
Figure 14B:
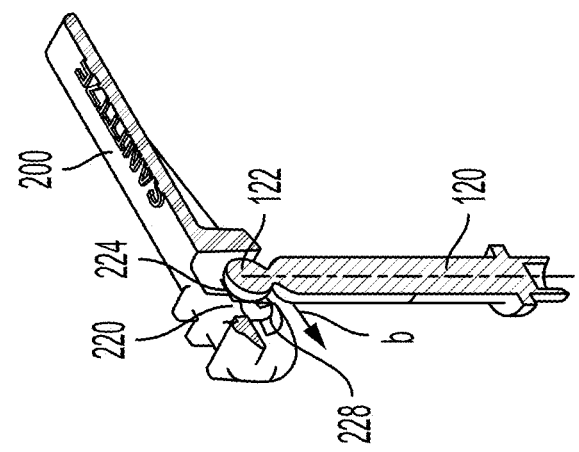
Figure 14A:
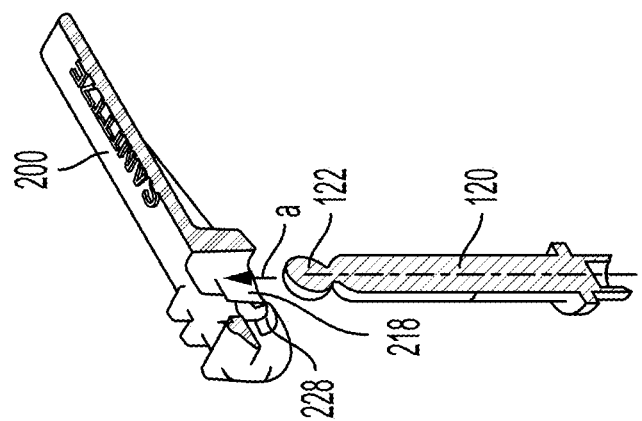

Referring now to FIGS. 14A-14D, sequential cross-sectional view of the lever 200 being mounted to the valve stem ball 122 are shown. As shown in FIG. 14A, to easily mount the lever 200 on to the valve stem ball 122, the seat portion 204 is pushed on to the valve stem ball 122 by movement along arrow "a" so that the valve stem ball 122 passes through the entry 218. Preferably, the valve stem ball 122 is fully inserted against the partially closed end 224 as shown in FIG. 14B. Then the user simply pulls the lever 200 in a proximal direction, along arrow "b," so that the valve stem ball 122 passes through the passage 220 by popping past the deflectable fingers 228 further into the seat portion 204 for capture in the retention cavity 226 as shown in FIG. 14C.

Once the valve stem ball 122 is in the retention cavity 226, the fingers 228 undeflect to secure the valve stem ball 122 in the retention cavity 228 while still enabling free rotation of the lever 200 about an axis "a" (see FIGS. 3A and 3B) of the elongated valve stem 120. In other words, in the normal position, the lever 200 is able to rotate in a plane with the axis "a" being normal to the plane, in a clockwise and counterclockwise direction while the valve stem ball 122 remains stationary.

As best seen in FIGS. 2B and 2C, the valve stem ball 122 necks down to match the arcuate shape of the fingers 228. As a result of the free rotation, in tight spaces such as undersink mounting, the lever 200 may be rotated to an orientation that allows movement from the normal position to the purge position without interference. Thus, the user can move the lever 200 into the purge position more easily.

Referring particularly to FIG. 14C, for actuation of purge, the user grasps the handle portion 202 and pulls outward to rotate about a second axis (not shown but coming out of the page in, for example, FIG. 2B) that is perpendicular to the first axis "a" of FIGS. 2B and 14C for pulling the elongated valve stem 120 into the purge position shown in FIG. 14D. It is to be appreciated that since the lever 200 is free to rotate about axis "a", the location of axis "b" varies depending upon the location of the lever 200 but the axis "b" remains substantially perpendicular to the axis "a" in the normal position.

As noted above, the lever 200 rotates on the rounded cam surface 206 to become parallel to the valve stem 120, which passes into the open end 208 while being pulled out of the valve assembly 100. To pass from the purge position to the normal position, the user simply reverses the motion. Preferably, the tension on the valve stem 120 will allow simply starting the return motion and the lever 200 will effectively snap back into the normal position once the rounded cam surface 206 re-engages the flange 126 and/or the ring 127.

It is also envisioned that the lever 200 can be removed from the valve stem 120 and only engaged thereto when actuation is desired. In such an embodiment, the lever 200 is pulled upward and pushed distally to maneuver the valve stem ball 122 from the retention cavity 226, through the passage 220 and back into the entry 218 so that the lever 200 lifts off the valve stem ball 122. However, the lever 200 may also be configured to be permanently installed onto the valve stem ball 122. In either case, when deployed, the protective cover 150 may be utilized to prevent inadvertent actuation of the lever 200.

Figure 15:
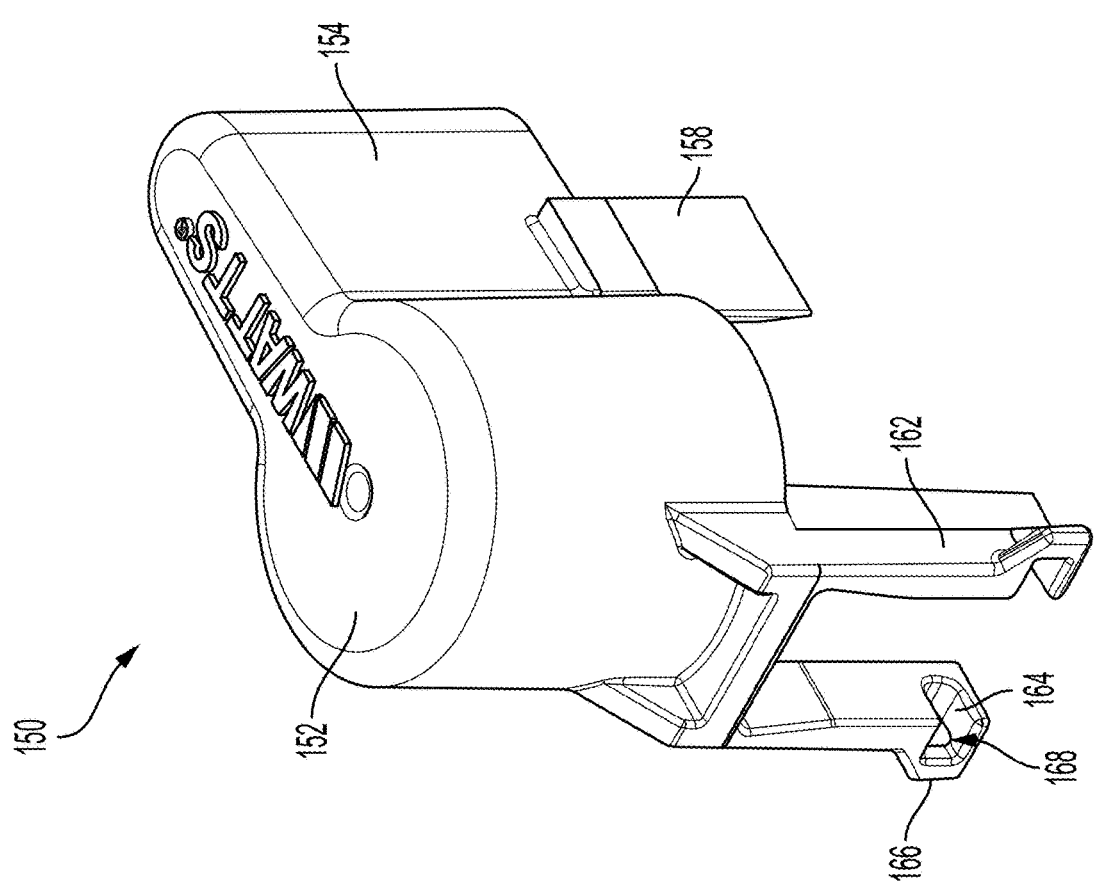
FIG. 15 is an isolated, top perspective view of the protective cover of FIG. 1.
Figure 16:
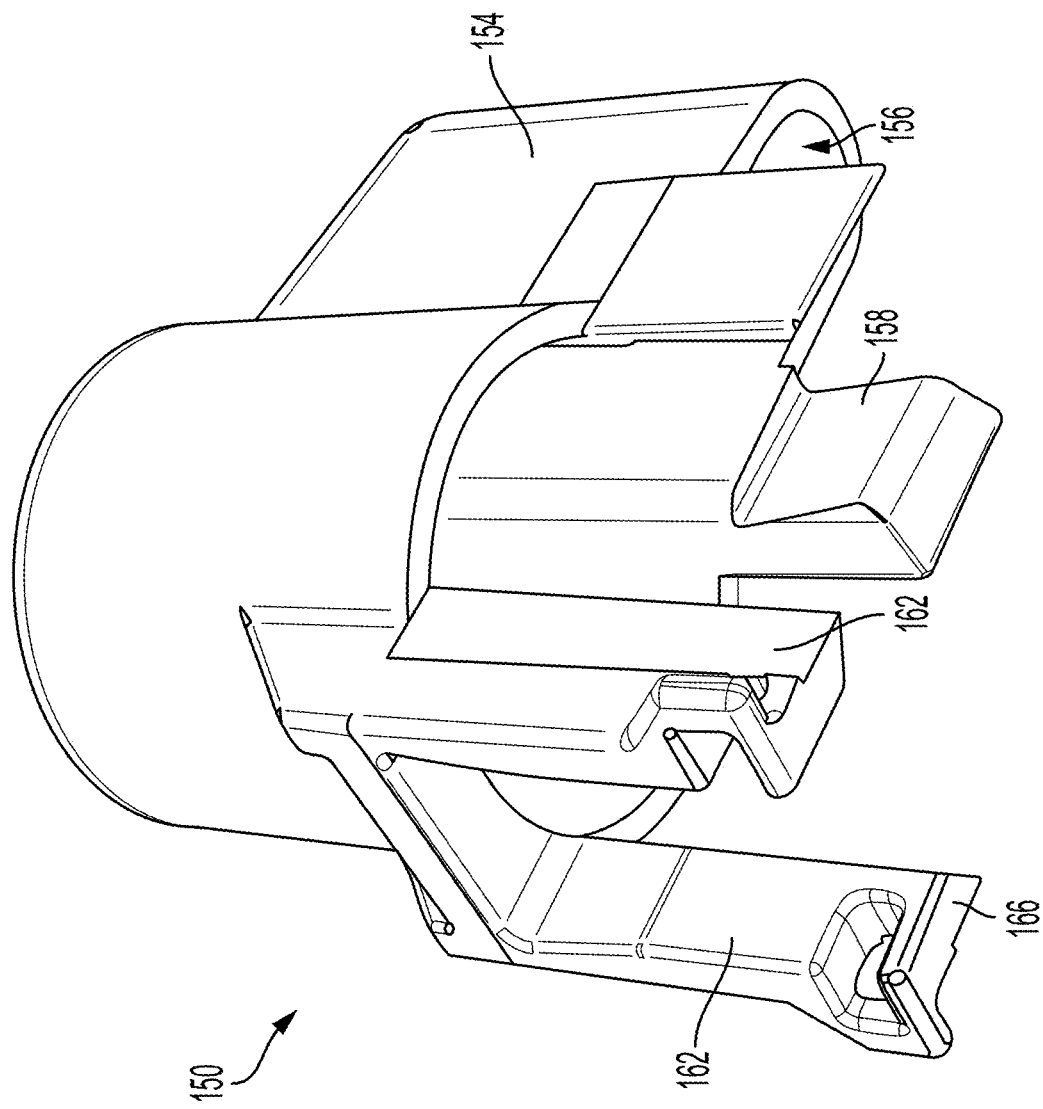
FIG. 16 is an isolated, rear perspective view of the protective cover of FIG. 1, showing appendages and branches for fixation onto the thermostatic mixing valve.
Figure 17:
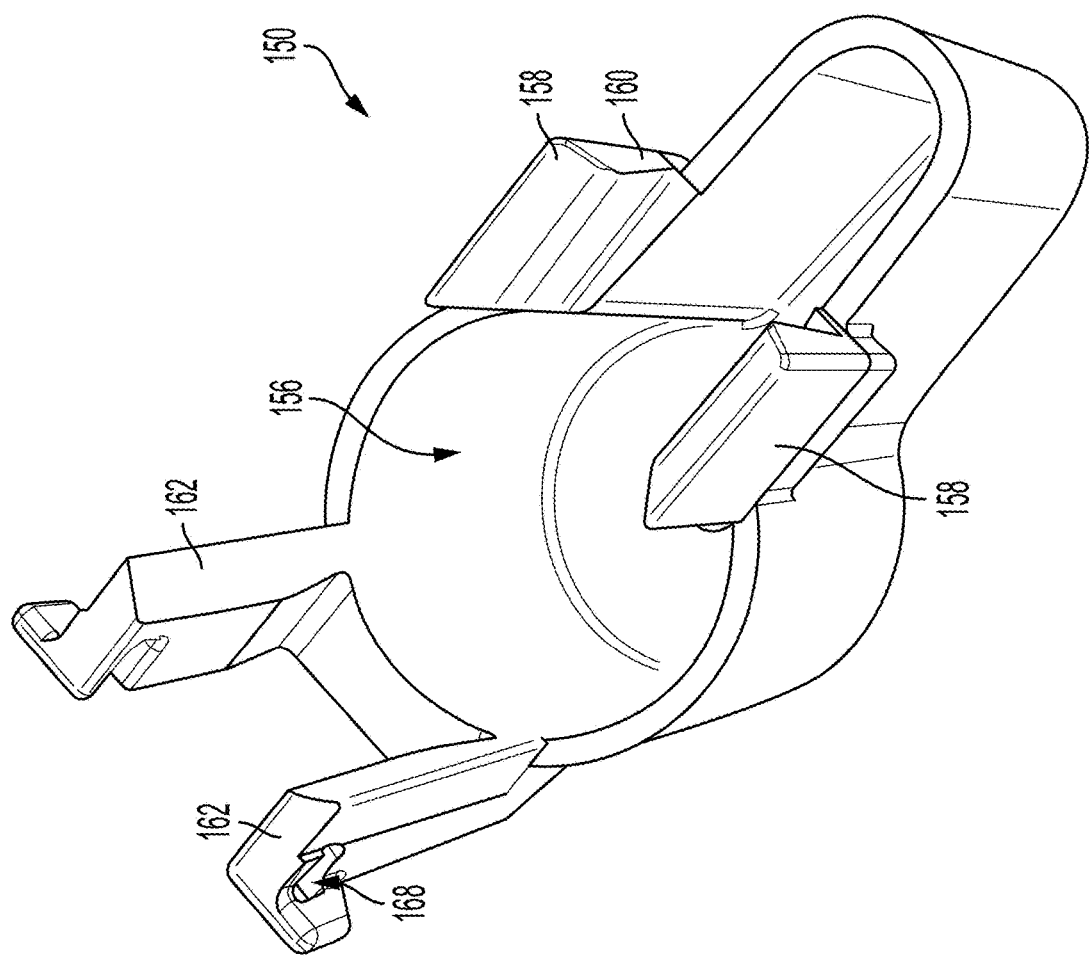
FIG. 17 is an isolated, bottom perspective view of the protective cover of FIG. 1, showing the interior of the protective cover.

Referring now to FIGS. 15-17, various views of the protective cover 150 are shown, isolated from the main body 102. The protective cover 150 is preferable fabricated from plastic so that some of the features are resilient and flexible.

The protective cover 150 spans from a seat cover portion 152 and tapers to a handle cover portion 154. In this regard, the protective cover 150 includes an interior 156 complimentary to the shape of the lever 200. The protective cover 150 shelters the lever 200 from unintended actuation. The protective cover 150 couples to the main body 102 via two opposing appendages 158 disposed between the seat cover portion 152 and the handle cover portion 154. The appendages 158 each have a triangular cross-sectional shape 160 such that the appendages 158 converge relative to each other to snugly encircle the main body 102. After converging, the appendages 158 diverge, best seen with reference to FIG. 15. In this regard, the appendages 158 can easily slide on to and wrap around grasping points formed by the main body 102 of the valve assembly 100. In one embodiment, the appendages 158 are flexible to deflect for easier removal and installation.

The protective cover 150 also includes two opposing branches 162 defined by the seat cover portion 152, extending from the cap 150. Each branch 162 defines a slot 164 such that a bar (not distinctly shown) can span between and seat in the slots 164. As such, the bar locks into the branches 162 to hold the cap 150 around the cold inlet 108 or cold outlet 112 as the case may be depending upon orientation of the lever 200. A distal end 166 of each branch 162 may also form a hole 168 so that a tie-wrap (not shown) can be threaded through the holes 168 to pull the branches 162 together to fix the protective cover 150 in place. As can be seen, the protective cover 150 can be quickly and easily installed to prevent inadvertent access to the lever 200 and quickly and easily removed when access is needed.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., holes, guide surfaces, appendages, branches, surfaces and the like) shown as distinct for purposes of illustration may be incorporated within other functional elements in a particular implementation.

Further, although the subject technology has been described with respect to the field of a particular valve assembly, it is envisioned that the subject technology would be equally applicable to other fields and applications such as on any lever that actuates any kind of assembly.

All patents, patent applications and other references disclosed herein are hereby expressly incorporated in their entireties by reference. While the subject technology has been described with respect to preferred embodiments, those skilled in the art will readily appreciate that various changes and/or modifications can be made to the subject technology without departing from the spirit or scope of the invention as defined by the appended claims. For example, each claim may depend from any or all claims in a multiple dependent manner even though such has not been originally claimed.

What is claimed is:

1. A snap-fit lever for selective actuation of a valve assembly, wherein the valve assembly has an elongated valve stem with a ball, the snap-fit lever comprising:
   a proximal handle portion;
   a distal seat portion coupled to the handle portion, the seat portion defining: an entry; a retention cavity; and a passage from the entry to the retention cavity for guiding the ball from the entry to the retention cavity; and
   a pair of deflectable fingers protruding from the seat portion to form part of the retention cavity and the passage, the pair of deflectable fingers configured to deflect to allow the ball to move from the passage into the retention cavity for capturing the ball in the retention cavity and enabling 360 degrees of rotation of the handle portion about a first axis along the elongated valve stem for setting a preferred orientation of the proximal handle portion in a normal valve stem position while still allowing rotation, for approximately 90 degrees, from the normal valve stem position of the handle portion about a second axis that is perpendicular to the first axis for selectively moving the elongated valve stem into an actuated valve stem position.

2. The snap fit lever of claim 1, wherein the entry and retention cavity have rounded walls to match the ball of the valve stem.

3. The snap fit lever of claim 1, wherein the seat portion has a distal rounded surface adjacent a flat portion for camming against the valve assembly and locking in the actuated position, respectively.

4. The snap fit lever of claim 1, wherein the seat portion defines a distal open end for allowing passage of the valve stem in the actuated position.

5. The snap fit lever of claim 1, wherein a user pushes the ball into the entry and pulls on the handle portion in a proximal direction to move the ball into the retention cavity and, thereby, attach the snap fit lever to the valve stem and the pair of deflectable fingers are configured to undeflect and sweep around to cup the ball connector once the ball connector reaches the retention cavity, enabling a snap fit between the ball connector and the snap fit lever.

6. The snap fit lever of claim 1, wherein the entry is linearly shaped to receive the ball connector along a line normal to the elongated proximal handle portion and includes a partially closed end as a stop to align the ball to the passageway.

7. The snap fit lever of claim 1, wherein the passage and retention cavity are aligned with the entry such that the ball connector travels through the passage to the retention cavity via a proximal pulling force or a distal pushing force on the elongated proximal handle portion.

8. A snap fit lever for actuation of a valve stem of a valve assembly, the valve stem having a ball connector disposed thereon, the snap fit lever comprising:
   a lever housing having a handle portion and a seat portion, wherein the seat portion defines an entry;
   a retention cavity defined by an interior of the lever housing;
   a passage extending into the lever housing, initiating at the entry and terminating in the retention cavity, the passage defining a guide slot to facilitate insertion of the ball connector through the passage; and
   a deflectable finger forming part of the retention cavity, the deflectable finger configured to:
      deflect upon insertion of the ball connector through the passage and into the retention cavity; and
      undeflect and sweep around to cup the ball connector once the ball connector reaches the retention cavity, enabling a snap fit between the ball connector and the snap fit lever,
   wherein the passage and retention cavity are aligned with the entry such that the ball connector travels from the entry through the passage to the retention cavity via a force on the handle portion.

9. The snap fit lever of claim 8, wherein the ball connector travels through the passage by pulling the handle portion of the lever housing proximally and the lever housing is configured to freely rotate in a plane once the ball connector reaches the retention cavity, wherein the valve stem is substantially perpendicular to the plane.

10. The snap fit lever of claim 8, wherein: the lever housing defines a handle surface and a cam surface opposite the handle surface, the handle surface and the cam surface joining at a proximal and distal end of the snap fit lever; and the cam surface defines the entry into the lever housing.

11. The snap fit lever of claim 8, wherein the guide slot comprises two grooves defined by opposite passage walls, the guide slot extending from the entry to the retention cavity.

12. The snap fit lever of claim 8, wherein the deflectable finger deflects out of the passage by radial hinging motion to enable the ball connector to reach the retention cavity.

13. The snap fit lever of claim 8, wherein the deflectable finger comprises an unsecured distal portion and a proximal portion fixed to the retention cavity to enable the deflectable finger to hinge from the proximal portion arm upon deflection.

14. The snap fit lever of claim 8, further comprising a cover coupled to the valve assembly for protecting the lever housing from inadvertent actuation.

15. The snap fit lever of claim 8, wherein the retention cavity is formed by an arc and spherical radius of the deflectable finger.

16. A snap-fit lever for selective actuation of a valve assembly, wherein the valve assembly has an elongated valve stem with a ball extending along a valve stem axis, the snap-fit lever comprising:
- a proximal handle portion;
- a seat portion coupled to the handle portion, the seat portion has a distal rounded surface for camming against the valve assembly and locking in an actuated position and the seat portion defines a distal open end for allowing passage of the valve stem therethrough into the actuated position; and
- a finger protruding from the seat portion configured to deflect for capturing the ball, wherein:
- in a normal position, the proximal handle portion is normal to and free to rotate about the valve stem axis; and
- in the actuated position, the proximal handle portion is rotated approximately 90 degrees to parallel the valve stem axis via the distal open end.

17. The snap fit lever of claim 16, wherein the finger partially defines a retention cavity for the ball, the seat portion defines an entry connected to the retention cavity by a passageway, and the entry aligns the ball to the passageway for assembly.

* * * * *